United States Patent [19]

Tachibana et al.

[11] Patent Number: 5,609,541
[45] Date of Patent: Mar. 11, 1997

[54] SYNCHRONOUS BELT USING RUBBERIZED FACING FABRIC

[75] Inventors: Hiroyuki Tachibana; Mitumori Kasada; Kimichika Ohno, all of Kobe, Japan

[73] Assignee: Bando Chemical Industries, Ltd., Kobe, Japan

[21] Appl. No.: 406,185

[22] Filed: Mar. 16, 1995

[30] Foreign Application Priority Data

Mar. 17, 1994 [JP] Japan .................................. 6-046668

[51] Int. Cl.$^6$ ........................................................ F16G 1/28
[52] U.S. Cl. ................................................ 474/205; 474/271
[58] Field of Search .................................. 474/266, 268, 474/271, 204, 205

[56] References Cited

U.S. PATENT DOCUMENTS 3,284,278  11/1966  Falcone et al. .
5,093,426   3/1992  Sakabe et al. ............................ 525/223
5,378,206   1/1995  Mizuno et al. ...................... 474/205 X

FOREIGN PATENT DOCUMENTS 0547880  12/1992  European Pat. Off. .
6364948  10/1961  Japan .
2-99667  11/1990  Japan .

Primary Examiner—Roger J. Schoeppel
Attorney, Agent, or Firm—Sixbey Friedman Leedom & Ferguson; Gerald J. Ferguson, Jr.; Thomas W. Cole

[57] ABSTRACT

A facing fabric covering tooth faces of tooth rubber layers of a belt body is treated with a rubber composition in which hydrogenated acrylonitrile-butadiene rubber is mixed with N,N'-m-phenylenedimaleimide.

4 Claims, 3 Drawing Sheets

SYNCHRONOUS BELT USING RUBBERIZED FACING FABRIC

BACKGROUND OF THE INVENTION

This invention relates to improvements of a facing fabric for belt and a synchronous belt using the same, and specifically relates to improvements of adhesive property of the facing fabric and improvements of durability of tooth rubber layers.

A synchronous belt as a power transmission belt generally has a belt body composed of: a backing rubber layer in which a plurality of cords are embedded in a longitudinal direction of belt, and a large number of tooth rubber layers integrally provided on the backing rubber layer at regular intervals in the longitudinal direction of belt. The tooth rubber layers of the belt body are covered with a facing fabric.

In recent years, such a synchronous belt has been employed in various kinds of fields and is often used under severe conditions such as high-speed rotation, high load and high temperature. The use of the synchronous belt under such severe conditions progresses deterioration of materials forming the belt. This frequently causes, at an early stage, the tooth rubber layers to shatter or the cords to break, thereby shortening a belt life. It is therefore desired to enhance the durability of the synchronous belt.

To meet the above requirement, there have been now increasingly performed improvements of the belt body such as the use of rubber having good heat resistance for rubber forming the belt body. Out of such improvements, special attention is focused on a synchronous belt applying hydrogenated acrylonitrile-butadiene rubber (hereinafter, also referred to as "H-NBR") for rubber portion forming the belt body since H-NBR has excellent heat resistance.

Meanwhile, since the facing fabric has also a significant effect on the belt life, researches on the facing fabric have been done parallel with the researches on the belt body. For example, it is proposed to subject the facing fabric to adhesive treatment with a rubber composition in which H-NBR is mixed with silica, metylene donor, and resorcin or denatured product thereof (See Japanese Utility-Model Application Laid-Open No. 63-64948). Further, there is also proposed a facing fabric subjected to adhesive treatment with a rubber composition in which H-NBR or the like is mixed with nickel compound (See Japanese Patent Application Laid-Open No. 2-99667).

However, while each of the facing fabrics subjected to adhesive treatment with the above rubber compositions has excellent heat resistance resulting from characteristics of H-NBR and nickel compound and has a large strength maintaining ratio even after heat-aged, its adhesive property and abrasion resistance are insufficient. In particular, since a synchronous belt receives intensive stresses at tooth roots thereof, it may be broken at an early stage due to cracks generated at the tooth roots if its adhesive property and abrasion resistance are not sufficiently secured.

This invention has been made in view of the foregoing problem and has its object of enhancing not only heat resistance and the strength maintaining ratio of the facing fabric but also its abrasion resistance and its adhesive properties to rubber forming the belt body and to rubber for treating tension members such as cords, by subjecting the facing fabric to treatment with a rubber composition in which H-NBR is mixed with a specific additive. In particular, this invention has its object of preventing the belt from breaking at an early stage due to cracks generated at its tooth root to increase the belt life.

SUMMARY OF THE INVENTION

To attain the foregoing objects, first and second solutions of this invention are conducted in relation to a facing fabric, and third to seventh solutions are conducted in relation to a synchronous belt using the facing fabric.

Specifically, the first and second solutions are focused on a facing fabric for covering a large number of tooth rubber layers integrally provided on a backing rubber layer at regular intervals in a longitudinal direction of belt. These solutions are as follows.

That is, the first solution of this invention has a feature that the facing fabric is treated with a rubber composition in which hydrogenated acrylonitrile-butadiene rubber (H-NBR) is mixed with N,N'-m-phenylenedimaleimide.

The second solution of this invention premises the first solution and has a feature that a ratio of mixture of N,N'-m-phenylenedimaleimide is set to 0.5 to 10 parts by weight with respect to hydrogenated acrylonitrile-butadiene rubber (H-NBR) of 100 parts by weight.

The third to seventh solutions of this invention are focused on a synchronous belt in which a belt body thereof is composed of: a backing rubber layer in which a plurality of cords are embedded in a longitudinal direction of belt; and a large number of tooth rubber layers integrally provided on the backing rubber layer at regular intervals in the longitudinal direction of belt, and in which tooth faces of the tooth rubber layers of the belt body are covered with a facing fabric. These solutions are as follows.

That is, the third solution of this invention has a feature that the facing fabric is treated with a rubber composition in which hydrogenated acrylonitrile-butadiene rubber (H-NBR) is mixed with N,N'-m-phenylenedimaleimide.

The fourth solution of this invention premises the third solution and has a feature that a ratio of mixture of N,N'-m-phenylenedimaleimide is set to 0.5 to 10 parts by weight with respect to hydrogenated acrylonitrile-butadiene rubber (H-NBR) of 100 parts by weight.

The fifth solution of this invention premises the third or fourth solution and has a feature that at least tooth rubber layers each contain as a main ingredient hydrogenated acrylonitrile-butadiene rubber (H-NBR).

The sixth solution of this invention premises the fifth solution and has a feature that the cords are subjected to adhesive treatment with a treatment liquid containing chlorosulfonated polyethylene rubber.

The seventh solution of this invention premises the fifth solution and has a feature that the cords are subjected to adhesive treatment with a treatment liquid containing hydrogenated acrylonitrile-butadiene rubber (H-NBR).

Under the above structure, in the first and second solutions of this invention. H-NBR contained in the rubber composition as a treatment liquid for facing fabric enhances heat resistance of the facing fabric and a strength maintaining ratio of the facing fabric after heat-aged. Further, combination of H-NBR and N,N'-m-phenylenedimaleimide presents, in addition to the above effects, increase in adhesive property and abrasion resistance of the facing fabric, so that a sufficient strength maintaining ratio can be obtained even after the belt is used over the long term under high temperature conditions.

In the third to seventh solutions of this invention, because of characteristics of the facing fabric treated as abovementioned, the synchronous belt sufficiently endures stress focused on tooth roots so as not to break at the tooth roots. Further, since crosslinking is accelerated in rubber forming the tooth rubber layer and in rubber contained as an ingredient in the treatment liquid for subjecting the cords to adhesive treatment, the belt life is extensively increased. In particular, in the fifth to seventh solutions of this invention, crosslinking is distinctively performed.

DESCRIPTION OF THE PREFERRED EMBODIMENTS

Description is made below about preferred embodiments of this invention with reference to the drawings.

Figure 1:
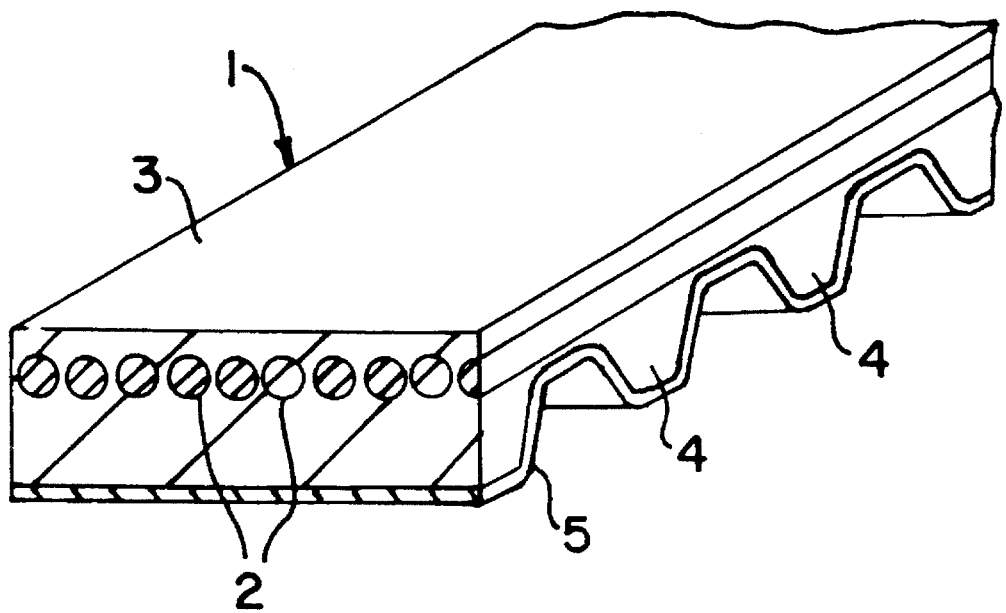
FIG. 1 is a cross-sectional diagram of a synchronous belt.

FIG. 1 shows a synchronous belt A according to an embodiment of this invention. The synchronous belt A has a belt body 1. The belt body 1 is composed of a backing rubber layer 3 in which a plurality of cords 2, 2, . . . as tension members are embedded in a longitudinal direction of belt, and a large number of tooth rubber layers 4, 4, . . . provided integrally on one face of the backing rubber layer 3 at regular intervals in the longitudinal direction of belt. Further, tooth faces of the tooth rubber layers 4 of the belt body 1 are covered with a facing fabric 5.

The backing rubber layer 3 and the tooth rubber layers 4 are formed of hydrogenated acrylonitrile-butadiene rubber (H-NBR) in which hydrogen is added to acrylonitrile-butadiene rubber (NBR) having double bonds to saturate the double bonds thereby restraining recombination reactions based on double bonds. In the case of using H-NBR, H-NBR is mixed with each necessary amount of vulcanizing agent, vulcanization accelertor, reinforcer, plasticizer and, as needed, various kinds of other additives.

The cord 2 is used in the form of, as needed, yarn formed of one kind of fibers, blended yarn formed by mixed fiber spinning or twisted yarn formed of blended fibers. The material of the cord 2 is selected according to the purpose out of glass fiber, aromatic polyamide fiber, polyester fiber, whisker fiber, metallic fiber and the like.

Further, the cords 2 are subjected to adhesive treatment in order to be adhered to rubber forming the belt body 1. A treatment liquid used for the adhesive treatment is rubber cement so formed that rubber such as natural rubber (NR), styrene-butadiene rubber (SBR), chloroprene rubber (CR), acrylonitrile-butadiene rubber (NBR), chlorosulfonated polyethylene rubber (CSM) and hydrogenated acrylonitrile-butadiene rubber (H-NBR) is dissolved in organic solvent such as methylethylketone (MEK) and toluene. One of treatment liquids respectively containing the above various kinds of rubber ingredients is selectively used according to the purpose. In particular, chlorosulfonated polyethylene rubber (CSM) and hydrogenated acrylonitrile-butadiene rubber (H-NBR) are preferable because they are distinctively crosslinked owing to N,N'-m-phenylenedimaleimide forming the below-mentioned treatment liquid for the facing fabric 5.

The facing fabric 5 is formed of material such as aliphatic polyamide fiber, aromatic polyamide fiber and polyester fiber. Its weave design is selected according to the purpose.

The facing fabric 5 is treated with a rubber composition in which H-NBR is mixed with N,N'-m-phenylenedimaleimide. A ratio of mixture of N,N'-m-phenylenedimaleimide is set to 0.5 to 100 parts by weight with respect to H-NBR of 100 parts by weight. The reason for such a setting is that while N,N'-m-phenylenedimaleimide of less than 0.5 parts by weight has little adhesive effect, N,N'-m-phenylenedimaleimide of more than 10 parts by weight causes decrease in heat resistance and decrease in belt life due to generated cracks. When the rubber composition is used for treating the facing fabric 5, it is mixed with each necessary amount of vulcanizing agent, vulcanization accelerator, reinforcer, plasticizer and, as needed, various kinds of other additives.

The above treatment for the facing fabric 5 can be conducted by various kinds of method commonly used, for example, a method of applying on the facing fabric 5, with an applying device such as roller coater, rubber cement formed in such a manner that the rubber composition is dissolved by suitable organic solvent or a method of dipping the facing fabric 5 in the rubber cement. Further, if necessary, the facing fabric 5 may be preliminarily treated with a treatment liquid including a composition of RFL (resorein-formaldehyde condensation product and latex) or other treatment liquids.

Figure 2:
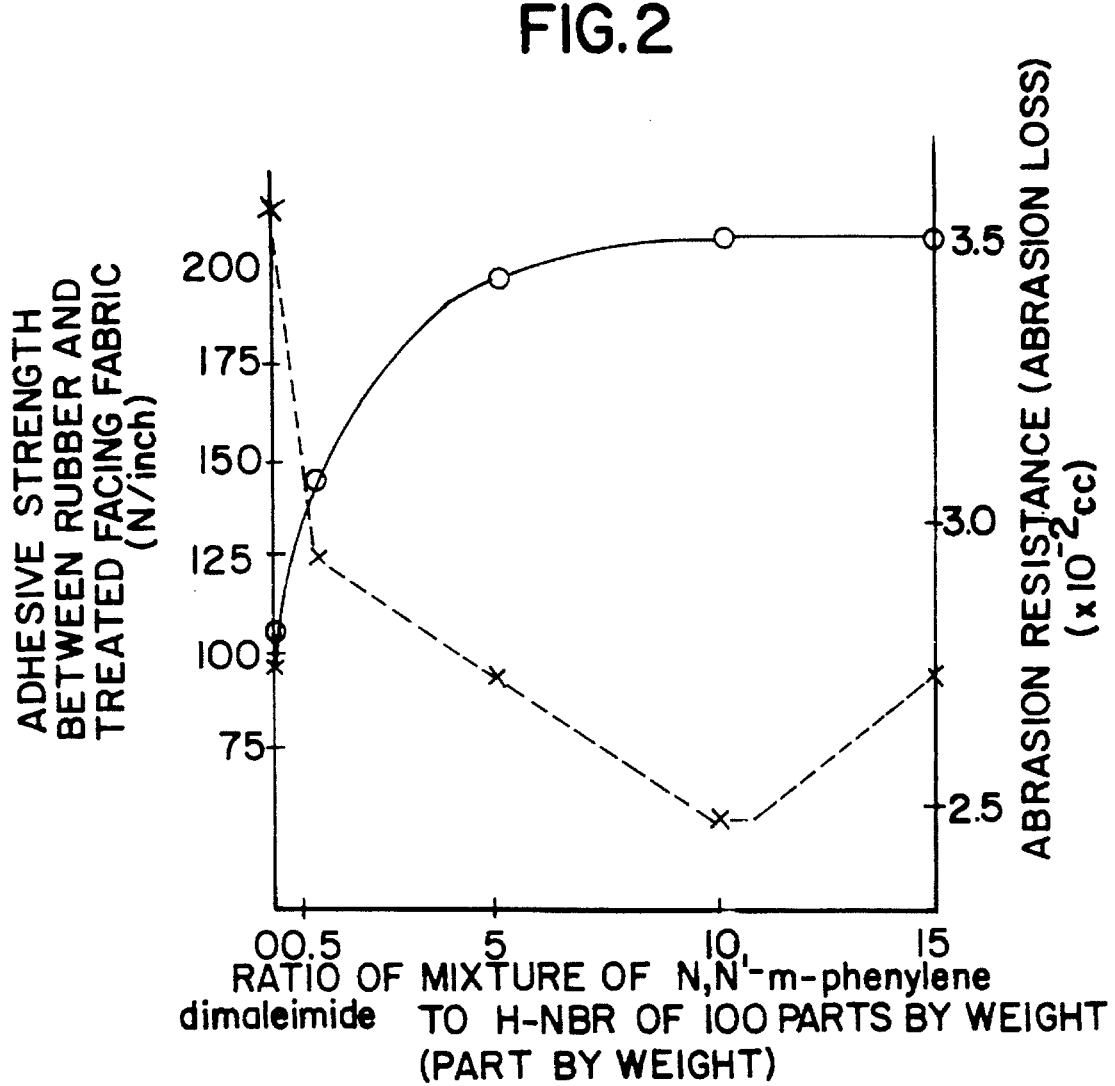
FIG. 2 is a graph which illustrates data showing the relationship between adhesive strength of a facing fabric to rubber and a ratio of mixture of N,N'-m-phenylenedimaleimide with H-NBR in a rubber composition forming a treatment liquid for facing fabric and date showing the relationship between abrasion resistance (abrasion lost) of the facing fabric and the ratio of mixture of N,N'-m-phenylenedimaleimide with H-NBR in the same rubber composition.

Shown in Table 1 and FIG. 2 are test results of synchronous belts according to embodiments of this invention and test results of synchronous belts according to comparative examples. The conditions when the test results are obtained will be described next.

Rubber composition for belt body

Both the embodiments of this invention and the comparative examples used rubber compositions in which N,N'-m-phenylenedimaleimide was excepted from respective rubber compositions shown in upper sections of Table 1.

Material of facing fabric

Both the embodiments of this invention and the comparative examples used 6,6-nylon fiber.

Material of cord

Both the embodiments of this invention and the comparative examples used glass fiber cords.

Treatment of facing fabric

Both the embodiments of this invention and the comparative examples were subjected to preliminary treatment with an RFL liquid and adhesive treatment with respective treatment liquids composed of rubber compositions shown in Table 1. The application amount of rubber became 260 g/m$^2$.

Treatment of cords

Both the embodiments of this invention and the comparative examples were each subjected to adhesion treatment with a RFL liquid commonly used and thereafter were each subjected to adhesive treatment with a treatment liquid of rubber cement composed of a rubber composition containing chlorosulfonated polyethylene rubber (CSM).

Measurement details of adhesive strength between rubber and treated facing fabric Prepared were test pieces in each of which a facing fabric was integrally interposed in each of rubber members composed of rubber compositions shown in upper sections of Table 1. Then, the interface between the rubber composition and the facing fabric in each test piece was peeled at a peeling speed of 50 mm/min.

Details of abrasion test

Figure 3:
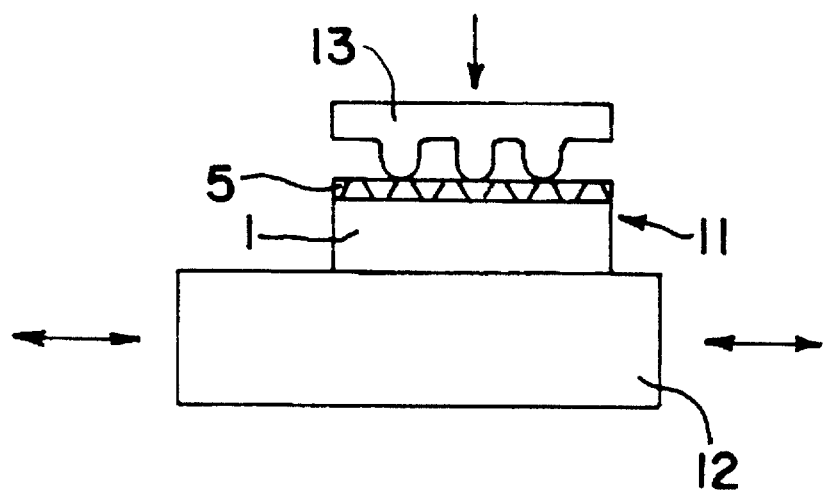
FIG. 3 is an explanatory diagram of an abrasion test.

As shown in FIG. 3, prepared were test pieces 11 as treated facing fabric complexes in each of which a facing fabric 5 was adhesively bonded to each of rubber members 1' composed of rubber compositions shown in upper sections of Table 1. Then, each of the test pieces 11 was set on a slide table 12 of an abrasion test machine at the state that the facing fabric 5 was faced upward, and an abrasion jig 13 was set on the facing fabric 5 of the test piece 11. On conditions that a load of 20 kg was applied from above to the test piece 11 with the abrasion jig 13 at a temperature of 25° C., a driving motor (not shown) was rotated at a rotation speed of 800 rpm so that rotational torque thus generated was converted to a horizontally linear movement, thereby horizontally sliding the slide table 12.

Calculation of strength maintaining ratio of facing fabric after heat-aged

Each of the facing fabrics treated in the above-mentioned manner was punched in dimensions of 3×20 cm to form a test piece. The test piece was entered into a thermostat of which an inner temperature was held to 120° C. Then, the test piece was retrieved therefrom after 72 hours and subsequently was aged for 24 hours at a room temperature. Thereafter, the test piece was subjected to a tensile test at a tension speed of 300 m/min so that a strength maintaining ratio (%) was obtained according to the following formula.

Strength maintaining ratio (%)=(Strength after aged/Strength before aged)×100

Conditions of measurement of belt life due to cracks

A synchronous belt was wound between a driving pulley having 18 teeth and a driven pulley having 18 teeth. Under conditions that a load of 4PS was applied to the driven pulley and a tension of 20 kg was applied to the synchronous belt, the driving pulley was rotated at 1000 rpm at a temperature of 100° C.

As is evident from the test results, it will be appreciated that the embodiments 1 to 3 of this invention are more excellent in almost all evaluation items than the comparative examples 1 to 4.

In the comparative example 1 in which the rubber composition did not include N,N'-m-phenylenedimaleimide, the adhesive strength between the rubber and the facing fabric was low. In the comparative example 2 in which a ratio of mixture of N,N'-m-phenylenedimaleimide is 15 parts by weight, though the adhesive strength between the rubber and the facing fabric was better, the strength maintaining ratio of facing fabric after heat-aged was lower and the belt life due to cracks was shorter. In the comparative example 3, since H-NBR was not used in the rubber composition forming a treatment liquid for facing fabric, evaluations were worse in all the evaluation items. In the comparative example 4, though the strength between the rubber and the facing fabric was slightly higher than the comparative example 3, it was lower than the embodiments 1 to 3 of this invention and evaluations were as bad in other evaluation items as the comparative example 3.

It will be appreciated from the above test results that the deference in evaluation between the embodiments of this invention and the comparative examples depends on whether or not the treatment liquid for facing fabric contains H-NBR and N,N'-m-phenylenedimaleimide at a suitable ratio of mixture.

TABLE 1

| | Embodiment of This Invention | | |
|---|---|---|---|
| | 1 | 2 | 3 |
| Rubber Composition for Facing Fabric (parts by weight) | | | |
| H-NBR *1 | 100 | ← | ← |
| Carbon black *2 | 50 | ← | ← |
| Plasticizer | 5 | ← | ← |
| ZnO | 5 | ← | ← |
| Stearic acid | 1 | ← | ← |
| Antioxidant | 3 | ← | ← |
| Sulfur | 0.8 | ← | ← |
| Vulcanization accelerator TT | 2 | ← | ← |
| Vulcanization accelerator CZ | 1 | ← | ← |
| N,N'-m-phenylenedimaleimide | 0.5 | 5 | 10 |
| Total | 168.3 | 172.8 | 177.8 |
| Evaluation items | | | |
| Adhesive Strength between Rubber and Treated Facing Fabric (N/inch) | 140 | 200 | 210 |
| Abrasion Resistance of Treated Facing Fabric Complex *4 (Abrasion loss) (×10$^{-2}$ cc) | 2.9 | 2.7 | 2.5 |
| Strength Maintaining Ratio of Facing Fabric after Aged *5 (%) | 75 | 73 | 70 |
| Belt Life due to Cracks *6 (index) | 160 | 185 | 180 |

| | Comparative Example | |
|---|---|---|
| | 1 | 2 |
| Rubber Composition for Facing Fabric (parts by weight) | | |
| H-NBR *1 | 100 | ← |
| Carbon black *2 | 50 | ← |
| Plasticizer | 5 | ← |
| ZnO | 5 | ← |
| Stearic acid | 1 | ← |
| Antioxidant | 3 | ← |
| Sulfur | 0.8 | ← |
| Vulcanization accelerator TT | 2 | ← |
| Vulcanization accelerator CZ | 1 | ← |
| N,N'-m-phenylenedimaleimide | 0 | 15 |
| Total | 167.8 | 182.8 |
| Evaluation Items | | |
| Adhesive Strength between Rubber and Treated Facing Fabric (N/inch) | 110 | 205 |
| Abrasion Resistance of Treated Facing Fabric Complex *4 (Abrasion loss) (×10$^{-2}$ cc) | 3.6 | 2.7 |
| Strength Maintaining Ratio of Facing Fabric after Aged *5 (%) | 72 | 55 |
| Belt Life due to Cracks *6 (index) | 100 | 85 |

| | Comparative Example | |
|---|---|---|
| | 3 | 4 |
| Rubber Composition for Facing Fabric (parts by weight) | | |
| CR *3 | 100 | ← |
| Carbon black *2 | 50 | ← |
| Plasticizer | 5 | ← |
| ZnO | 5 | ← |
| Stearic acid | 1 | ← |

TABLE 1-continued

| | | |
|---|---|---|
| Antioxidant | 3 | ← |
| MgO | 4 | ← |
| Vulcanization accelerator TT | 2 | ← |
| N,N'-m-phenylenedimaleimide | 0 | 3 |
| Total | 170 | 173 |
| Evaluation items | | |
| Adhesive Strength between Rubber and Treated Facing Fabric (N/inch) | 80 | 110 |
| Abracion Resistance of Treated Facing Fabric Complex *4 (Abrasion loss) (×10$^{-2}$ cc) | 4.2 | 3.7 |
| Strength Maintaining Ratio of Facing Fabric after Aged *5 (%) | 35 | 37 |
| Belt Life due to Cracks *6 (index) | 38 | 40 |

*1 ZETPOL 2020 produced by Nippon Zeon Co., Ltd.
*2 FEF (Fast extrusion furnace)
*3 NEOPRENE GRT produced by Showa Electric DuPont Co., Ltd.
*4 Temp.: 25° C., Load: 20 kg, Rotational Speed: 800 rpm
*5 120° C. × 72 hr.
*6 Temp.: 100° C., Number of Pulley Teeth: 18, Tensile Strength: 20 kg, Load: 4PS, Rotational Speed: 1000 rpm

We claim:

1. A synchronous belt comprising:

a belt body having a backing rubber layer in which a plurality of cords are embedded in a longitudinal direction of belt and a large number of tooth rubber layers are integrally provided on the backing rubber layer at regular intervals in the longitudinal direction of belt; and a facing fabric covering tooth faces of the tooth rubber layers of the belt body, said facing fabric being treated with a rubber composition in which hydrogenated acrylonitrile-butadiene rubber is mixed with N, N'-m-phenylenedimaleimide, wherein at least said tooth rubber layers each contain as a main ingredient acrylonitrile-butadiene rubber to enhance adhesiveness between said facing fabric and said tooth rubber layers.

2. A synchronous belt according to claim 1, wherein a ratio of mixture of N, N'-m-phenylenedimaleimide is set to 0.5 to 10 parts by weight with respect to hydrogenated acrylonitrile-butadiene rubber of 100 parts by weight.

3. A synchronous belt according to claim 2, wherein the cords are subjected to adhesive treatment with a treatment liquid containing chlorosulfonated polyethylene rubber.

4. A synchronous belt according to claim 2, wherein the cords are subjected to adhesive treatment with a treatment liquid containing hydrogenated acrylonitrile-butadiene rubber.

* * * * *